United States Patent
Triana Zorsano

(10) Patent No.: US 11,326,573 B1
(45) Date of Patent: May 10, 2022

(54) SPARK PLUG TESTING TOOL

(71) Applicant: General Electric Company, Schenectady, NY (US)

(72) Inventor: Rubi Elizabeth Triana Zorsano, Monterrey-Nuevo León (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/325,665

(22) Filed: May 20, 2021

(51) Int. Cl.
- *F02P 17/12* (2006.01)
- *H01T 13/58* (2020.01)
- *F02C 7/266* (2006.01)
- *H01T 13/60* (2011.01)

(52) U.S. Cl.
CPC ............ *F02P 17/12* (2013.01); *F02C 7/266* (2013.01); *H01T 13/58* (2013.01); *H01T 13/60* (2013.01); *F02P 2017/121* (2013.01)

(58) Field of Classification Search
CPC ..... F02C 7/266; F02P 17/12; F02P 2017/121; H01T 13/58; H01T 13/60
USPC ................................ 324/393, 396, 398, 402
See application file for complete search history.

(56) References Cited

U.S. PATENT DOCUMENTS

| | | | |
|---|---|---|---|
| 1,695,557 | A | 12/1928 | Myers |
| 3,360,718 | A | 12/1967 | Williams |
| 3,548,592 | A | 6/1969 | Hopkins |
| 4,121,419 | A | 10/1978 | Kuznetsov et al. |
| 4,570,124 | A | 2/1986 | Fuchs |
| 9,735,553 | B1 | 8/2017 | Zheng et al. |
| 2006/0127354 | A1 | 6/2006 | Shalaby et al. |
| 2017/0328335 | A1 | 11/2017 | Leeson |
| 2019/0032561 | A1 | 1/2019 | Stoia et al. |

FOREIGN PATENT DOCUMENTS

WO    2016/172767 A1    11/2016

*Primary Examiner* — Erick R Solis
(74) *Attorney, Agent, or Firm* — Eversheds Sutherland (US) LLP

(57) ABSTRACT

The present application provides a spark plug testing tool for a spark plug assembly of a gas turbine engine combustor. The spark plug testing tool may include a dielectric tube attached to the spark plug assembly and a first support bracket to support the spark plug assembly and the dielectric tube therein such that the spark plug assembly remains electrically connected to the gas turbine engine combustor during testing.

20 Claims, 3 Drawing Sheets

SPARK PLUG TESTING TOOL

TECHNICAL FIELD

The present application and the resultant patent relate generally to gas turbine engines and more particularly relate to an improved spark plug testing tool to test a spark plug assembly in a fast, safe, and efficient manner while the spark plug assembly remains attached to the gas turbine engine.

BACKGROUND OF THE INVENTION

A spark plug assembly may include a spark plug, a spark plug flange, and an ignition transformer. During testing, the spark plug assembly may be removed from a combustor but remains attached to the electric cables. Given the relatively short length of the cables, the spark plug assembly generally is placed on the combustor for testing. This position, however, may create direct access to an electrical high voltage arc or other type of discharge. Such access may create a potential hazard for nearby personnel. As a result, other types of work activities in the turbine compartment or elsewhere may need to be suspended and the other workers may need to be evacuated during the test period. Overall productivity thus may be decreased while waiting on the spark plug testing procedures to be completed.

SUMMARY OF THE INVENTION

The present application and the resultant patent thus provide a spark plug testing tool for a spark plug assembly of a gas turbine engine combustor. The spark plug testing tool may include a dielectric tube attached to the spark plug assembly and a first support bracket to support the spark plug assembly and the dielectric tube therein such that the spark plug assembly remains electrically connected to the gas turbine engine combustor during testing.

The present application and the resultant patent further provide a method of safely testing a spark plug assembly of a gas turbine engine combustor wherein the spark plug assembly includes a spark plug and spark plug flange. The method includes the steps of removing the spark plug assembly from the gas turbine engine combustor, while keeping the spark plug assembly electrically connected to the gas turbine engine combustor, positioning the spark plug of the spark plug assembly within a dielectric tube of a spark plug testing tool, positioning the spark plug flange of the spark plug assembly within a support bracket of the spark plug testing tool, and testing the spark plug assembly.

The present application and the resultant patent further provide a spark plug testing tool for a spark plug assembly of a gas turbine engine combustor. The spark plug testing tool includes a dielectric tube attached to the spark plug assembly, a support bracket to support the spark plug assembly and the dielectric tube therein, and a combustor bracket attached to the gas turbine engine combustor and the support bracket such that the spark plug assembly remains electrically connected to the gas turbine engine combustor during testing.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
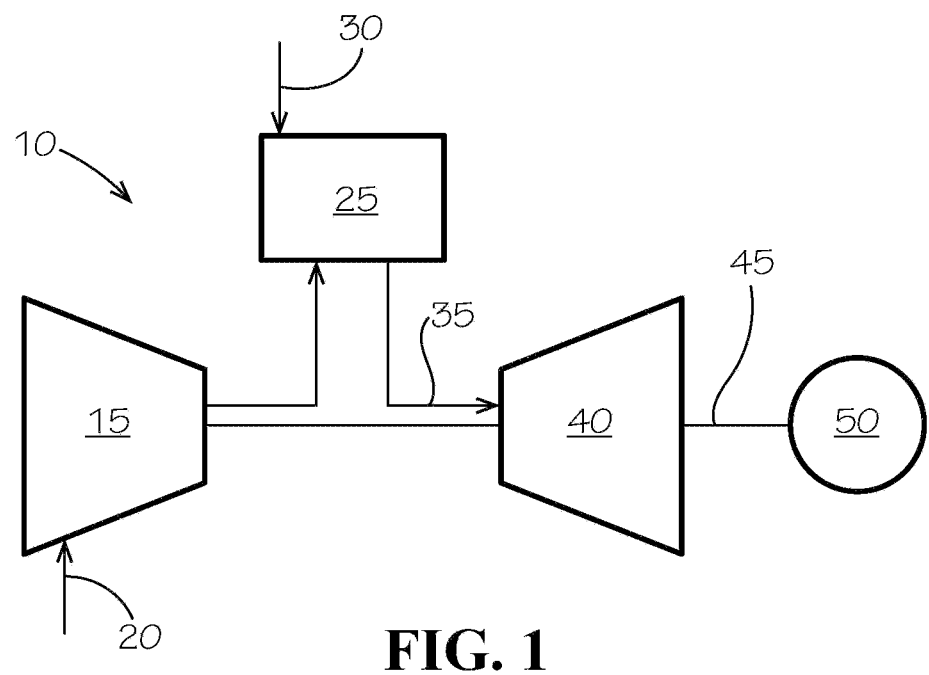
FIG. 1 is a schematic diagram of an exemplary gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. The flow of the hot combustion gases 35 is in turn delivered to a turbine 40. The flow of the hot combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
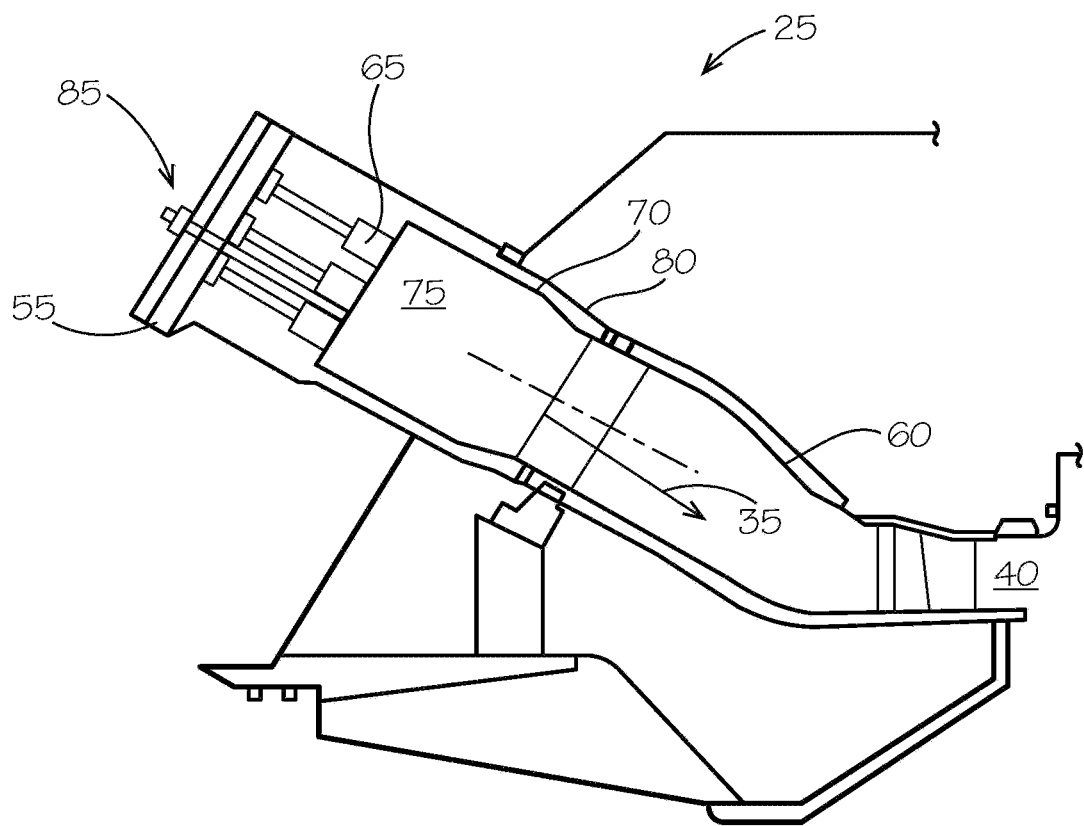
FIG. 2 is a schematic diagram of an exemplary combustor that may be used with the gas turbine engine of FIG. 1.

FIG. 2 shows a schematic diagram of an example of a combustor can 25 as may be used with the gas turbine engine 10 described above and elsewhere. The combustor can 25 may extend from an end cap 55 at a head end to a transition piece 60 at an aft end about the turbine 40. A number of fuel nozzles 65 may be positioned about the end cap 55. A liner 70 may extend from the fuel nozzles 65 towards the transition piece 60 and may define a combustion chamber 75 therein. The liner 70 may be surrounded by a flow sleeve 80. The liner 70 and the flow sleeve 80 may define a flow path therebetween for the flow of compressed air 20 from the compressor 15 or otherwise to the combustion chamber 75.

The combustor can 25 also may include a spark plug assembly 85. The spark plug assembly 85 may be configured to initiate combustion in the combustor can 25. Specifically, combustion may be initiated from two spark plug assemblies 85 attached to the combustor cans 25 in adjacent combustion chambers 60. As will be described in more detail below, each spark plug assembly 85 may include a spark plug 90 and an ignition transformer 95. A spark plug flange 98 may extend radially between the spark plug 90 and the ignition transformer 95. A spark from one or both of the spark plugs 90 ignites the fuel air mixture in the combustion chamber 75 while the remaining chambers may be ignited via crossfire tubes. The combustor can 25 described herein is for the purpose of example only. Combustor cans 25 with other components and other configurations may be used herein.

FIGS. 3-6 show an example of a spark plug testing tool 100 as may be described herein. The spark plug testing tool 100 tests the operability of the overall spark plug assembly 85. The spark plug testing tool 100 may be made largely out of dielectric materials to isolate a high voltage arc therein. Although acrylics, nylons, fiberglass, and rubber materials are described below, ceramics, composites, and the like also may be used herein.

The spark plug testing tool 100 includes a dielectric tube 110. The dielectric tube 110 may be made from a transparent acrylic material and the like. The dielectric tube 110 may be sized to accommodate the spark plug 90 therein. The dielectric tube 110 may be enclosed at a far end via a cap 120. The cap 120 also may be made from a dielectric material such as an acrylic. The cap 120 may be secured to the dielectric tube 110 with a number of cap fasteners 130 with a rubber gasket 140 positioned therebetween. The cap fasteners 130 may be nylon screws and the like.

Figure 3:
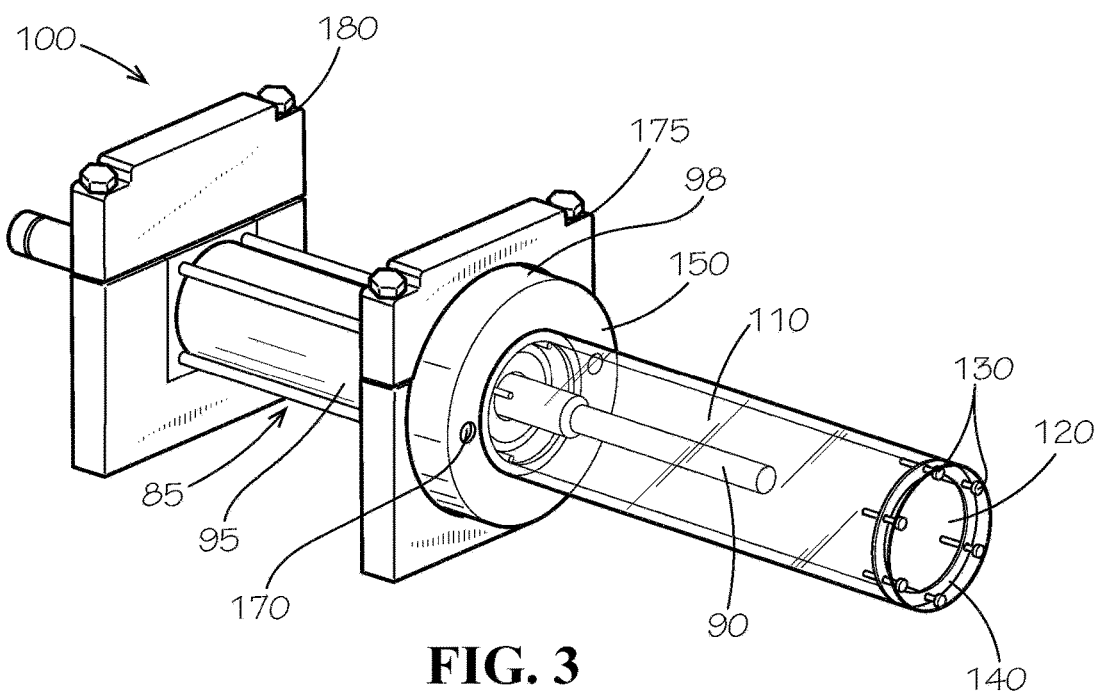
FIG. 3 is a perspective view of a spark plug testing tool as may be described herein.

At the near end, the dielectric tube 110 may be attached to the spark plug flange 98 of the spark plug assembly 85 via a tube flange 150 and a further rubber gasket 160. The tube flange 150 may be made from a dielectric material such as nylon and the like. The spark plug flange 98 may be secured to the tube flange 150 with a number of flange fasteners 170. The flange fasteners 170 may be fiberglass hex screws and the like. The dielectric tube 110 and the spark plug flange 98 may be support by a front or a first support bracket 175. The front support bracket 175 may be made from a dielectric material such as nylon and the like. As is shown in FIG. 3, a back or a second support bracket 180 also may be spaced apart from the front support bracket 175. The back support bracket 180 also may be made from a dielectric material such as nylon and the like. Other components and other configurations may be used herein.

Figure 4:
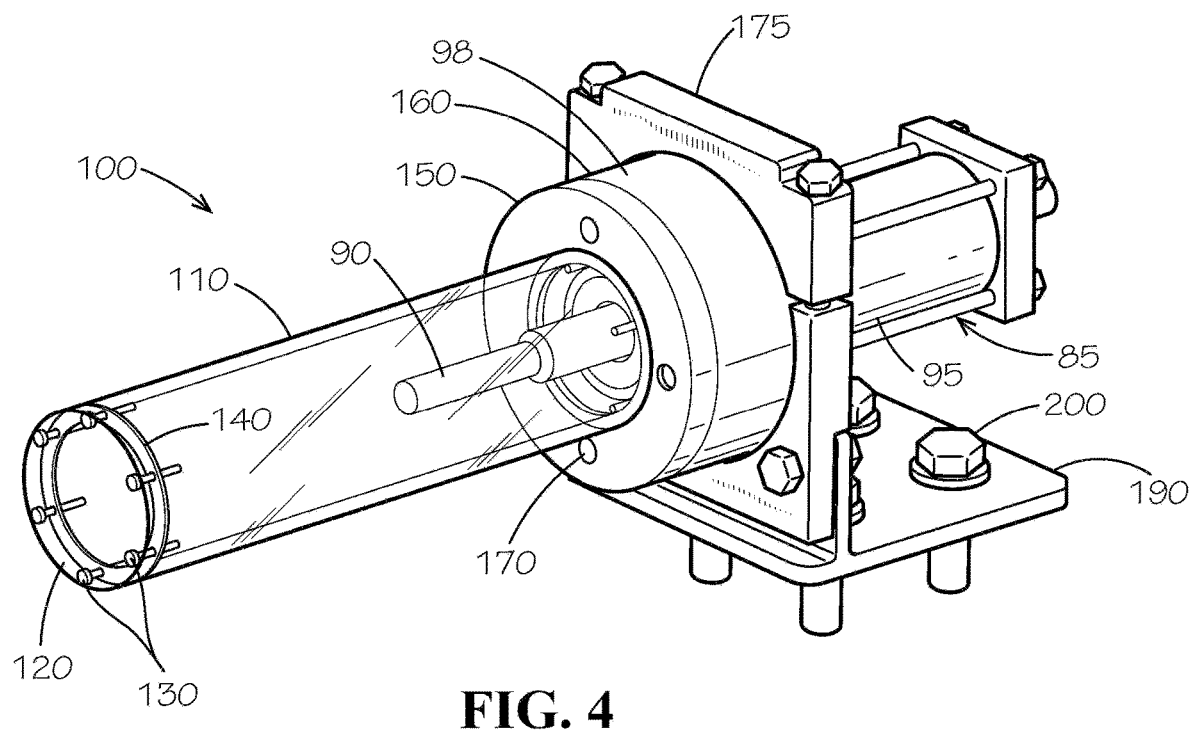
FIG. 4 is a further perspective view of the spark plug testing tool of FIG. 3 with an attachment bracket.
Figure 5:
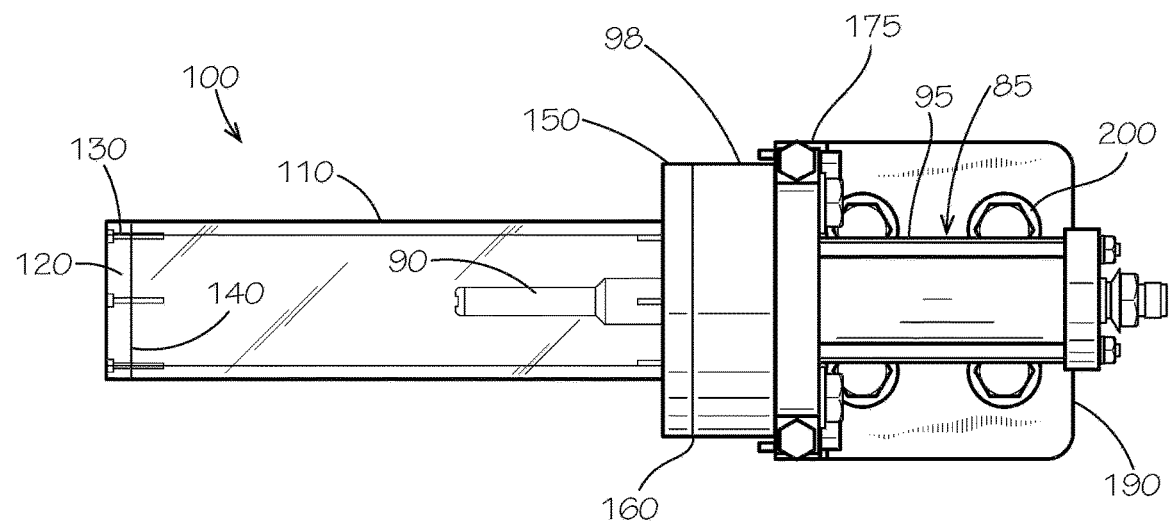
FIG. 5 is a top plan view of the spark plug testing tool of FIG. 4.
Figure 6:
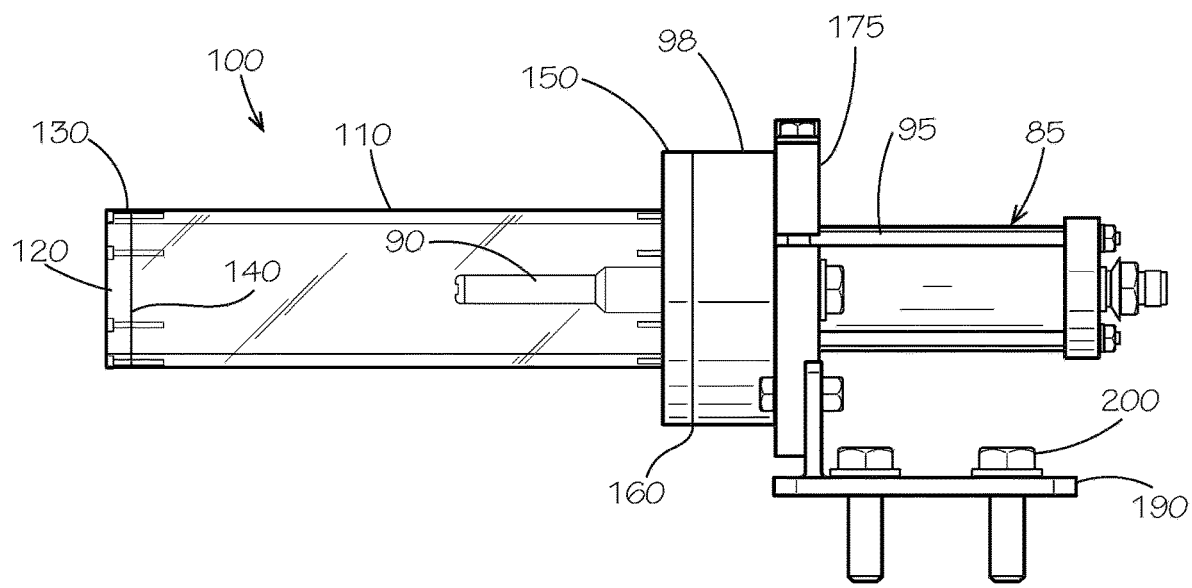
FIG. 6 is a side plan view of the spark plug testing tool of FIG. 4.

As is shown in FIGS. 4-6, the spark plug testing tool 100 may be attached to the combustor can 25 or elsewhere via a combustor bracket 190. The combustor bracket 190 may be attached to the combustor can 25 via a number of bracket fasteners 200. The combustor bracket 190 may be made out of steel or any type of suitably rigid materials. The bracket fasteners 200 may be conventional hex screws and the like. The combustor bracket 190 may accommodate and support front support bracket 175 and the spark plug assembly 85 therein. Moreover, the combustor bracket 190 may be sized to accommodate one or two spark plug testing tools 100 and spark plug assemblies 85 therein. Other types of support structures may be used herein. Other components and other configurations also may be used herein.

In use, the spark plug testing tool 100 may be mounted onto the combustor can 25 or elsewhere via the combustor bracket 190. The spark plug assembly 85 may be removed from the combustor can 25 and inserted within the spark plug testing tool 100, while the individual spark plug 90 remains electrically connected to the ignition transformer 95 (or gas turbine engine or combustor). Specifically, the spark plug 90 may be positioned within the dielectric tube 110 and the dielectric tube 110, the tube flange 150, and the rubber gasket 160 may be attached to the spark plug flange 98 via the flange fasteners 170. The spark plug testing tool 100 and the spark plug assembly 85 may be positioned within the front support bracket 175 and supported therein. The back support bracket 180 also may be used. The spark plug assembly 90 may now be safely tested without creating a hazard to nearby personnel. Specifically, during testing the spark plug 90 may be fired one or multiple times using the same electrical connection cables as would be used in normal operation of the gas turbine engine 10. Depending on the materials used herein, the dielectric tube 110 of the spark plug testing tool 100 may resist up to about 190,600 volts or more so as to create a high voltage resistant barrier during testing.

The use of the spark plug testing tool 100 thus increases safety about the turbine compartment so as to avoid the need to evacuate other nearby personnel during testing. The spark plug testing tool 100 thus may increase overall productivity during the spark plug testing procedures. Moreover, the overall spark plug testing time may be reduced.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A spark plug testing tool for a spark plug assembly of a gas turbine engine combustor, comprising:
   a dielectric tube attached to the spark plug assembly;
   a first support bracket to support the spark plug assembly and the dielectric tube therein; and
   wherein the spark plug assembly remains electrically connected to the gas turbine engine combustor during testing.

2. The spark plug testing tool of claim 1, wherein the dielectric tube comprises an acrylic material.

3. The spark plug testing tool of claim 1, wherein the dielectric tube comprises a transparent material.

4. The spark plug testing tool of claim 1, wherein the dielectric tube is enclosed by a dielectric cap.

5. The spark plug testing tool of claim 1, wherein spark plug assembly comprises a spark plug flange, wherein the dielectric tube comprises a tube flange, and wherein the tube flange is attached to the spark plug flange.

6. The spark plug testing tool of claim 5, wherein the first support bracket supports the spark plug flange therein.

7. The spark plug testing tool of claim 5, wherein the tube flange comprises a nylon material.

8. The spark plug testing tool of claim 5, wherein the first support bracket comprises a nylon material.

9. The spark plug testing tool of claim 5, further comprising a second support bracket spaced apart from the first support bracket.

10. The spark plug testing tool of claim 9, wherein the second support bracket comprises a nylon material.

11. The spark plug testing tool of claim 1, further comprising a combustor bracket attached to the gas turbine engine combustor.

12. The spark plug testing tool of claim 11, wherein the first support bracket is attached to the combustor bracket.

13. The spark plug testing tool of claim 1, wherein the spark plug assembly comprises a spark plug and wherein the dielectric tube is sized to accommodate the spark plug.

14. The spark plug testing tool of claim 1, wherein the spark plug assembly comprises an ignition transformer and wherein the first support bracket is sized to accommodate the ignition transformer.

15. A method of safely testing a spark plug assembly of a gas turbine engine combustor, wherein the spark plug assembly comprises a spark plug and spark plug flange, comprising:

removing the spark plug assembly from the gas turbine engine combustor, while keeping the spark plug assembly electrically connected to the gas turbine engine combustor;

positioning the spark plug of the spark plug assembly within a dielectric tube of a spark plug testing tool;

positioning the spark plug flange of the spark plug assembly within a support bracket of the spark plug testing tool; and testing the spark plug assembly.

16. A spark plug testing tool for a spark plug assembly of a gas turbine engine combustor, comprising:

a dielectric tube attached to the spark plug assembly;

a support bracket to support the spark plug assembly and the dielectric tube therein;

a combustor bracket attached to the gas turbine engine combustor and the support bracket; and wherein the spark plug assembly remains electrically connected to the gas turbine engine combustor during testing.

17. The spark plug testing tool of claim 16, wherein the dielectric tube comprises an acrylic material.

18. The spark plug testing tool of claim 17, wherein the dielectric tube is enclosed by a dielectric cap.

19. The spark plug testing tool of claim 18, wherein spark plug assembly comprises a spark plug flange, wherein the dielectric tube comprises a tube flange, and wherein the tube flange is attached to the spark plug flange.

20. The spark plug testing tool of claim 19, wherein the support bracket comprises a nylon material.

* * * * *